(12) United States Patent
Stallmann

(10) Patent No.: US 10,518,212 B2
(45) Date of Patent: Dec. 31, 2019

(54) METHOD OF TREATING A CARBON DIOXIDE RICH FLUE GAS AND A FLUE GAS TREATMENT SYSTEM

(71) Applicant: GENERAL ELECTRIC TECHNOLOGY GMBH, Baden (CH)

(72) Inventor: Olaf Stallmann, Essenheim (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 513 days.

(21) Appl. No.: 14/063,504

(22) Filed: Oct. 25, 2013

(65) Prior Publication Data

US 2014/0116358 A1    May 1, 2014

(30) Foreign Application Priority Data

Oct. 26, 2012  (EP) .................................... 12190213
Jun. 18, 2013  (EP) .................................... 13172576

(51) Int. Cl.
  *B01D 53/56*    (2006.01)
  *B01D 53/75*    (2006.01)
  (Continued)

(52) U.S. Cl.
  CPC ........... *B01D 53/565* (2013.01); *B01D 53/75* (2013.01); *B01D 53/864* (2013.01); *F01N 3/2066* (2013.01); *F23C 99/00* (2013.01); *B01D 53/26* (2013.01); *B01D 53/48* (2013.01); *B01D 53/8625* (2013.01); *B01D 2251/102* (2013.01); *B01D 2251/2062* (2013.01);
  (Continued)

(58) Field of Classification Search
  USPC ............................................ 122/23; 422/169
  See application file for complete search history.

(56) References Cited

U.S. PATENT DOCUMENTS 4,336,035 A    6/1982  Evenstad et al.
4,839,148 A    6/1989  Ritter et al.
(Continued)

FOREIGN PATENT DOCUMENTS

CN    86101184 A    8/1987
CN    87100906 A    9/1987
(Continued)

OTHER PUBLICATIONS

Office action issued from Chinese Patent Office dated Nov. 11, 2015 for CN Application No. 201310509497.5.

*Primary Examiner* — Steven B McAllister
*Assistant Examiner* — John E Bargero
(74) *Attorney, Agent, or Firm* — Grogan, Tuccillo & Vanderleeden, LLP

(57) ABSTRACT

A method of treating a carbon dioxide rich flue gas and a flue gas treatment system for treatment of a carbon dioxide rich flue gas are provided. A boiler system includes a boiler, being operative for combusting a fuel and generating a carbon dioxide rich flue gas, and the flue gas treatment system. The flue gas treatment system includes a gas cleaning system, a nitrogen oxides reduction unit, being operative for reducing at least a portion of a nitrogen oxide(s) content of the flue gas, and a compression and cooling device being operative for pressurizing and cooling at least a portion of the flue gas treated by the gas cleaning system and the nitrogen oxide(s) reduction unit.

15 Claims, 1 Drawing Sheet

(51) Int. Cl.
*F23C 99/00* (2006.01)
*F01N 3/20* (2006.01)
*B01D 53/86* (2006.01)
*B01D 53/26* (2006.01)
*B01D 53/48* (2006.01)

(52) U.S. Cl.
CPC ............... *B01D 2251/2067* (2013.01); *B01D 2255/1021* (2013.01); *B01D 2255/1023* (2013.01); *B01D 2255/207* (2013.01); *B01D 2256/22* (2013.01); *B01D 2257/104* (2013.01); *B01D 2257/30* (2013.01); *B01D 2257/404* (2013.01); *B01D 2257/502* (2013.01); *B01D 2258/0283* (2013.01); *Y02C 10/04* (2013.01)

(56) References Cited

U.S. PATENT DOCUMENTS

| | | |
|---|---|---|
| 4,853,194 A | 8/1989 | Hino et al. |
| 4,952,223 A | 8/1990 | Kirshnamurthy et al. |
| 4,985,219 A | 1/1991 | Helfritch et al. |
| 5,057,293 A | 10/1991 | Epperly et al. |
| 5,078,973 A | 1/1992 | Kuroda et al. |
| 5,213,780 A | 5/1993 | Helfritch |
| 5,362,463 A | 11/1994 | Stiles et al. |
| 5,585,081 A | 12/1996 | Chu et al. |
| 5,743,929 A * | 4/1998 | Kapoor ................ B01D 53/501 65/134.6 |
| 6,136,283 A | 10/2000 | Stern |
| 7,220,395 B2 | 5/2007 | Cooper, Sr. et al. |
| 7,320,288 B2 | 1/2008 | Marin et al. |
| 7,393,511 B2 | 7/2008 | Tran et al. |
| 7,416,716 B2 | 8/2008 | Allam et al. |
| 7,500,437 B2 | 3/2009 | Lefebvre et al. |
| 7,708,804 B2 | 5/2010 | Darde et al. |
| 7,776,297 B2 | 8/2010 | Cichanowicz |
| 7,927,572 B2 | 4/2011 | Degenstein et al. |
| 7,931,881 B2 | 4/2011 | Abrams et al. |
| 8,110,164 B2 | 2/2012 | Zhang et al. |
| 2004/0033184 A1 | 2/2004 | Greer |
| 2007/0178035 A1 | 8/2007 | White et al. |
| 2007/0232706 A1 | 10/2007 | Shah et al. |
| 2008/0184880 A1 | 8/2008 | Fan et al. |
| 2009/0075219 A1 * | 3/2009 | Vilagines ............. B01D 53/002 431/3 |
| 2009/0121191 A1 * | 5/2009 | Tillman ................ B01D 53/75 252/373 |
| 2009/0272300 A1 * | 11/2009 | Yamada ................ F22B 35/002 110/190 |
| 2010/0024476 A1 | 2/2010 | Shah |
| 2011/0014578 A1 * | 1/2011 | Rohde .................. F22B 1/18 431/75 |
| 2011/0076216 A1 * | 3/2011 | Orita .................... B01D 53/75 423/242.1 |
| 2011/0223083 A1 | 9/2011 | Bialkowski et al. |
| 2011/0288184 A1 | 11/2011 | Nardo et al. |
| 2011/0300046 A1 | 12/2011 | Schodel et al. |
| 2012/0129113 A1 | 5/2012 | Handagama et al. |
| 2013/0319040 A1 | 12/2013 | Naito |

FOREIGN PATENT DOCUMENTS

| | | |
|---|---|---|
| CN | 1049616 A | 3/1991 |
| CN | 101439260 | 5/2009 |
| CN | 102343201 A | 2/2012 |
| DE | 10 2008 062 495 | 6/2010 |
| EP | 0 162 536 | 11/1985 |
| EP | 0 734 754 A1 | 10/1996 |
| EP | 0 779 100 A1 | 6/1997 |
| EP | 1 790 614 | 5/2007 |
| EP | 2 156 878 A1 | 2/2010 |
| EP | 2 404 656 | 1/2012 |
| EP | 2404655 | 1/2012 |
| EP | 2 457 637 | 5/2012 |
| EP | 2 481 471 A1 | 8/2012 |
| GB | 2 498 272 A | 7/2013 |
| JP | 2000/070676 A | 3/2000 |
| JP | 2001227740 | 8/2001 |
| WO | 95/15463 A1 | 6/1995 |
| WO | 01/51178 A1 | 7/2001 |
| WO | 2005/007274 | 1/2005 |
| WO | 2008/144122 A1 | 11/2008 |
| WO | 2009/132661 | 11/2009 |
| WO | 2012/107953 | 8/2012 |

* cited by examiner

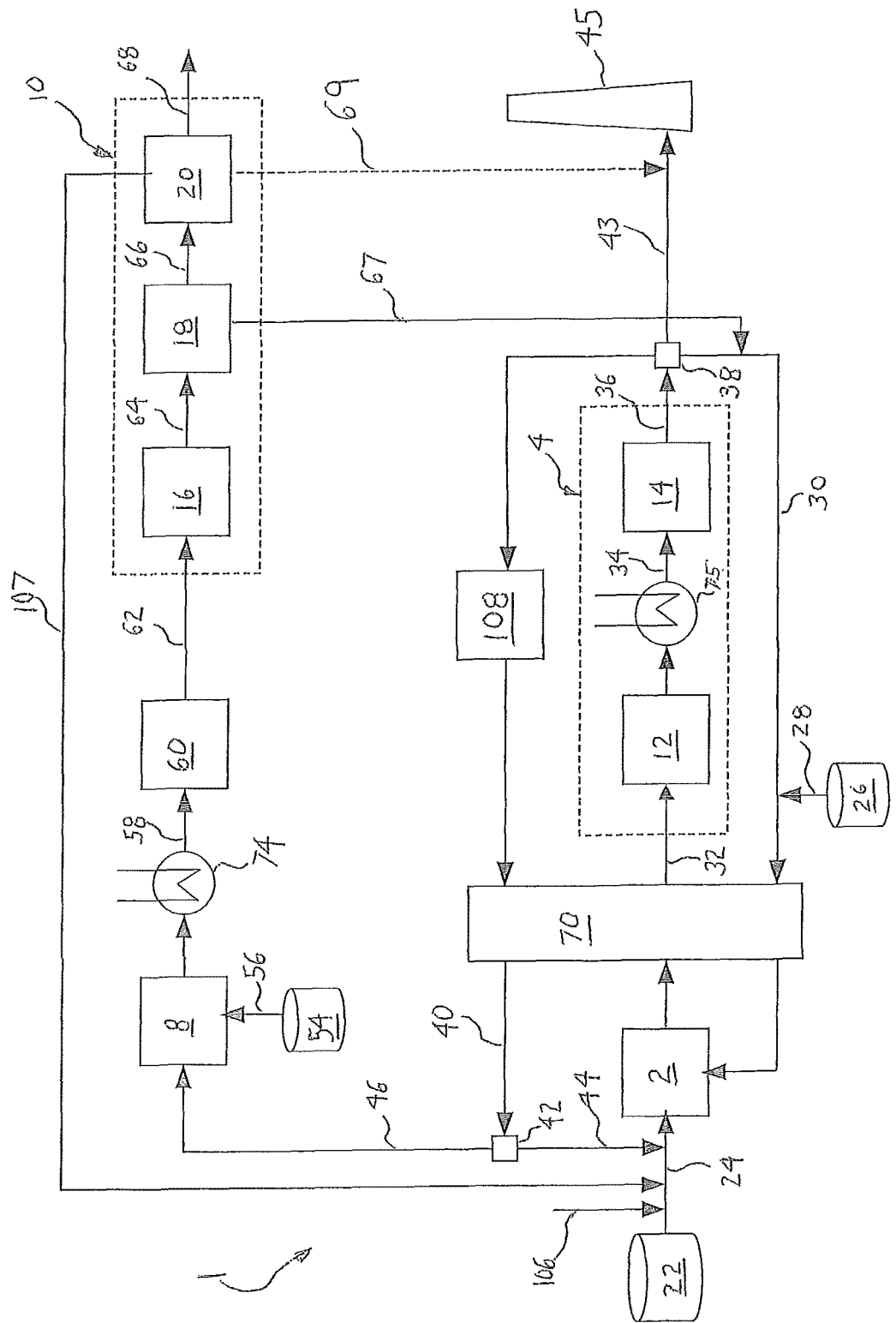

METHOD OF TREATING A CARBON DIOXIDE RICH FLUE GAS AND A FLUE GAS TREATMENT SYSTEM

CROSS-REFERENCE TO RELATED APPLICATIONS

This application claims priority to European application 12190213.4 filed Oct. 26, 2012 and European application 13172576.4 filed Jun. 18, 2013, both of which are hereby incorporated in their entireties.

TECHNICAL FIELD

The present application relates to a method of treating a carbon dioxide rich flue gas, said carbon dioxide rich flue gas further comprising contaminants, oxygen gas, water vapour, one or more nitrogen oxide(s) and, optionally, combustibles.

The present application also relates to a flue gas treatment system for treatment of a carbon dioxide rich flue gas and to a boiler system comprising the flue gas treatment system.

BACKGROUND

In the combustion of a fuel, such as coal, oil, peat, waste, etc., in a combustion plant, such as a power plant, a hot process gas is generated, such process gas typically containing, among other components, carbon dioxide, $CO_2$, oxygen gas, $O_2$, and nitrogen oxides, $NO_x$. With increasing environmental demands processes have been developed for removing carbon dioxide from the process gas and disposing of the removed carbon dioxide, in order to reduce the emission of carbon dioxide into the atmosphere. One such process, aimed at recovery of carbon dioxide of high purity from a carbon dioxide rich flue gas, involves compression of the flue gas, drying of the flue gas, liquefaction of carbon dioxide present in the flue gas and subsequent vaporization and compression of the carbon dioxide. A plant for performing such a process is often referred to as a gas processing unit, GPU.

An example of a gas processing unit is disclosed in EP 2 457 637 A1. The GPU of EP 2 457 637 A1 compresses a carbon dioxide rich flue gas coming from a gas cleaning system to an absolute pressure of at least 70 bar, making the carbon dioxide suitable for disposal, or suitable for being transported away for disposal. Such disposal could, for example, include pumping the carbon dioxide into a saline aquifer, pumping the carbon dioxide deep into the sea, or reusing the carbon dioxide in an industrial process. The disclosed GPU comprises, as its main units, a low pressure compression unit, an intermediate dehydration unit, an intermediate non-condensable gas removal unit, for example a $CO_2$ liquefaction unit, and a high pressure compression unit.

A problem prone to appear in a compression unit is the presence of nitrogen oxides and water vapour in the gas to be treated, leading to the formation of nitric and nitrous acids in the compression unit. The acids formed may corrode the surfaces of equipment treating the flue gas in a GPU or may otherwise impact adversely the operation of equipment treating the flue gas in a GPU.

The energy demand of a gas processing unit has negative effect on the net efficiency degree of the power plant. Accordingly, there is a need for improvements as regards the energy utilization of a GPU.

SUMMARY

According to aspects illustrated herein, there is provided a method of treating a carbon dioxide rich flue gas, said carbon dioxide rich flue gas further comprising contaminants, oxygen gas, water vapour, one or more nitrogen oxide(s) and, optionally, combustibles, wherein at least a portion of the contaminants present in the carbon dioxide rich flue gas is removed to obtain a cleaned carbon dioxide rich flue gas;

at least a portion of one or more nitrogen oxide(s) present in the carbon dioxide rich flue gas is removed to obtain a nitrogen depleted carbon dioxide rich flue gas; and at least a portion of the cleaned and nitrogen oxides depleted carbon dioxide rich flue gas is, in a first pressurization stage, pressurized and cooled so that at least a portion of the water vapour present in the carbon dioxide rich flue gas is condensed.

An advantage of this method is that the decrease of one or more nitrogen oxide(s) limits the formation of acids during condensation of water vapour present in the carbon dioxide rich flue gas or accumulate in the carbon dioxide product stream during condensation of carbon dioxide present in the carbon dioxide rich flue gas. Limiting the formation of nitrogen oxides from nitric oxide, i.e. maintaining more of the nitrogen oxide(s) as nitric oxide, furthermore facilitates separation of the carbon dioxide rich flue gas into a $NO_x$ lean carbon dioxide product and an NO enriched vent gas by condensation of carbon dioxide present in the carbon dioxide rich flue gas.

Before the nitrogen oxides present in the carbon dioxide rich flue gas is removed, heat may be transferred from the carbon dioxide rich flue gas to the cleaned carbon dioxide rich flue gas in a so-called gas to gas heat exchanger. In other words, heating of the cleaned carbon dioxide rich flue gas utilizing heat of the carbon dioxide rich flue gas that has not yet been cleaned may be performed before the nitrogen gas present in the carbon dioxide rich flue gas is removed. An advantage of such heat transfer is that the temperature of the cleaned carbon dioxide rich flue gas may be raised towards the temperature of the nitrogen oxides removal reaction. Such heat transfer may thus contribute to efficient utilization of energy by the method.

At least a portion of the nitrogen oxides depleted carbon dioxide rich flue gas may be further dehydrated by adsorption to, or absorption by, a drying agent of water vapour present in the nitrogen oxides depleted carbon dioxide rich flue gas. During such adsorption or absorption drying of a gas, the gas, in this case the nitrogen depleted carbon dioxide rich flue gas, is contacted with an adsorbent or absorbent, respectively. The term drying agent is used as a collective term for the terms adsorbent and absorbent. Since drying agent materials, such as molecular sieves or zeolites, decompose, or their function is otherwise impaired, if contacted with an acid, it is advantageous to utilize adsorption drying or absorption drying in a method in which acid formation is limited.

At least a portion of the nitrogen oxides depleted carbon dioxide rich flue gas, after having been further dehydrated by adsorption drying or absorption drying, may be further pressurized in a second pressurization stage, and the method may be devoid of condensation of carbon dioxide present in the carbon dioxide rich flue gas before the nitrogen oxides depleted carbon dioxide rich flue gas is pressurized in said second pressurization step. Due to the removal of the nitrogen oxides according to the present method, carbon dioxide of sufficiently high purity may result from the method without a need for removal of non-condensable gases, such as oxygen gas. Conventionally, removal of non-condensable gases involves condensation of carbon dioxide and removal of non-condensable gases present in the carbon dioxide rich flue gas. Thus, if requirements for a low residual nitrogen gas content can be met by the method, it is possible to omit the carbon dioxide separation and recompression stages of a conventional gas processing unit. Accordingly, an advantage in terms of a simplified process is obtained by operating the method without condensing carbon dioxide. However, the present method may alternatively comprise condensation of at least a portion of the carbon dioxide present in the carbon dioxide rich flue gas. Non-condensable gases present in the carbon dioxide rich flue gas may thus be removed in a vent gas.

During reduction of the nitrogen oxide(s), the temperature of the carbon dioxide rich flue gas is typically raised, such as to a temperature of above 250° C., as compared to the temperature of the cleaned carbon dioxide rich flue gas after removal of contaminants.

The carbon dioxide rich flue gas may be generated in a boiler combusting a fuel in the presence of a gas comprising oxygen gas. The fuel may be combusted in the presence of a gas comprising more than about 30% by volume of carbon dioxide and comprising about 10 to 50% by volume of oxygen gas, preferably in the presence of a gas comprising more than about 35% by volume of carbon dioxide and comprising about 21 to 32% by volume of oxygen gas. Thus, the boiler may combust the fuel in accordance with the so called oxy-fuel process. In an oxy-fuel process a fuel, such as one of the fuels mentioned below, is combusted in the presence of a carbon dioxide rich gas, such as a gas comprising a carbon dioxide enriched flue gas. Oxygen gas, which is provided by an oxygen source, is supplied to a boiler in which the oxygen gas oxidizes the fuel. In the oxy-fuel process a carbon dioxide rich flue gas is produced.

After removal of the contaminants present in the carbon dioxide rich flue gas, a portion of the cleaned carbon dioxide rich flue gas may be returned to the boiler to be present during combustion of the fuel, and at least a portion of the one or more nitrogen oxide(s) present in the remaining portion of the cleaned carbon dioxide rich flue gas may be reduced before the nitrogen oxide depleted carbon dioxide rich flue gas is pressurized and cooled in the first pressurization stage. Reduction of nitrogen oxide(s) is commonly referred to as a DeNOx process. The reduction of nitrogen oxide(s) present in the carbon dioxide rich flue gas contributes to alleviation of problems related to formation of nitric and nitrous acids by removing precursors of said acids from the carbon dioxide rich flue gas. An advantage of performing such reduction of nitrogen oxide(s) present in the carbon dioxide rich flue gas after a portion of the cleaned carbon rich flue gas has been returned to the boiler is that equipment and feed of consumables need only be dimensioned for the remaining portion of the cleaned carbon rich flue gas. An advantage of performing the reduction of nitrogen oxide(s) on the cleaned carbon dioxide rich flue gas is that contaminants, such as dust and sulphur oxides, otherwise present may impair accomplishment of the reduction. During reduction of the nitrogen oxide(s), the temperature of the carbon dioxide rich flue gas is typically raised, such as to a temperature of above 250° C., as compared to the temperature of the cleaned carbon dioxide rich flue gas after removal of contaminants.

Reduction of nitrogen oxide(s) may be performed by selective catalytic reduction, SCR, in which nitrogen oxides are reacted, with the aid of a catalyst, with a gaseous reductant, typically ammonia or urea, to form nitrogen, $N_2$, and water.

After the nitrogen gas present in the carbon dioxide rich flue gas has been removed, heat may be transferred from the oxygen depleted carbon dioxide rich flue gas to a working fluid of a water-steam cycle of the boiler, for example to preheat the condensate of an economizer. The heat may be transferred in order to generate steam or to preheat a condensate or boiler feed water. Since the catalytic oxidation reaction occurs at a high temperature, an advantage of utilizing the heat of the oxygen depleted carbon dioxide rich flue gas for the water-steam cycle of the boiler is that the total energy demand is lowered. Another possible use of the heat would be to preheat the oxygen needed for the combustion. In current oxy-combustion methods the oxygen is fed to the cleaned carbon dioxide rich flue before the gas to gas heat exchanger (streams 30 and stream 40 after unit 108). Internal leakages in this heat exchanger entrain oxygen from the colder, higher in pressure cleaned carbon dioxide rich flue gas to the warmer, lower in oxygen content and pressure, carbon dioxide rich flue gas coming from the boiler. This entrainment increases the oxygen concentration to the GPU and thus the energy requirements for $CO_2$ separation. Without preheating the oxygen the energy efficiency of the oxy boiler system would drop. Some designs foresee a use of steam for oxygen preheating which show a better performance. The possible injection after the flue gas heat exchanger would then have the benefit of superior energy efficiency and less loss of oxygen due to leakage streams in the gas to gas heat exchanger.

According to other aspects illustrated herein, there is provided a flue gas treatment system for treatment of a carbon dioxide rich flue gas, the flue gas treatment system comprising a gas cleaning system being operative for removing at least a portion of a contaminant content of the flue gas, a nitrogen oxides reduction unit, being operative for reducing at least a portion of one or more nitrogen oxide(s) content of the flue gas, and a first compression and cooling device being operative for pressurizing and cooling at least a portion of the flue gas treated by the gas cleaning system and the catalytic oxidation unit, so that at least a portion of a water vapour content present in the flue gas is condensed.

The nitrogen oxides reduction unit is commonly referred to as a DeNOx unit. The presence of the nitrogen oxides unit provides for reduction of nitrogen oxide(s) present in the flue gas, which reduction contributes to alleviation of problems related to formation of nitric and nitrous acids by removing precursors of said acids from the flue gas. An advantage of such nitrogen oxides reduction unit being operative for reducing the nitric oxide(s) content of a remaining portion of the flue gas is that equipment and feed of consumables need only be dimensioned for the remaining portion of the flue gas. Preferably the nitrogen oxides reduction unit is upstream of the catalytic oxidation unit. During treatment in the nitrogen oxides reduction unit, the temperature of the flue gas is typically raised, such as to a temperature of above 250° C., as compared to the temperature of the flue gas before such treatment.

An advantage of this flue gas treatment system is that the nitrogen oxides reduction unit prevents the formation of acids during condensation of water vapour in the first compression and cooling device or accumulate in the carbon dioxide product stream during condensation of carbon dioxide present in the carbon dioxide rich flue gas. Limiting the formation of nitrogen dioxide from nitric oxide, i.e. maintaining more of the nitrogen oxide(s) as nitric oxide, furthermore facilitates separation of the carbon dioxide rich flue gas into a $NO_x$ lean carbon dioxide product and an NO enriched vent gas by condensation of the carbon dioxide present in the carbon dioxide rich flue gas. During treatment in the nitrogen oxides reduction unit, the temperature of the flue gas is typically raised, such as to a temperature of above 250° C., as compared to the temperature of the flue gas before such treatment.

The flue gas treatment system may further comprise, upstream, in the direction of flow of the flue gas, of the nitrogen removal unit a heat exchanger operative for transferring heat from the flue gas upstream of the gas cleaning system to the flue gas downstream of the gas cleaning system. In other words, heating of flue gas downstream of the gas cleaning system utilizing heat of the flue gas that is upstream of the gas cleaning system may be performed upstream, in the direction of flow of the flue gas. An advantage of such a heat exchanger is that the temperature of the flue gas downstream of the gas cleaning system may be raised towards the operation temperature of the subsequent nitrogen oxides reduction unit. Such a heat exchanger may thus contribute to efficient utilization of energy by the system.

The flue gas treatment system may further comprise a dehydration unit comprising a drying agent, the dehydration unit being operative for removing at least a portion of a water vapour content of the flue gas. Water vapour, present in the flue gas is adsorbed to or absorbed by, respectively, the drying agent. Since drying agent materials, such as molecular sieves or zeolites, decompose, or their function is otherwise impaired, if contacted with an acid, it is advantageous to utilize a dehydration unit comprising a drying agent in a system in which acid formation is limited.

The flue gas treatment system may further comprise, downstream, in the direction of flow of the flue gas, of the dehydration unit a second compression device being operative for further pressurizing at least a portion of the flue gas, wherein the flue gas treatment system is devoid of a carbon dioxide condensation unit upstream, in the direction of flow of the flue gas, of the second compression device. Due to the presence of the nitrogen oxides eduction unit of the present system, carbon dioxide of sufficiently high purity may result from the system without a need for removal of non-condensable gases. Conventionally, removal of non-condensable gases involves passing the flue gas through a carbon dioxide condensation unit and removing non-condensable gases present in the carbon dioxide rich flue gas. Accordingly, an advantage in terms of a simplified process is obtained by operating the method without a carbon dioxide condensation unit. However, the present system may alternatively comprise a carbon dioxide condensation unit, such as a carbon dioxide liquefaction unit. Non-condensable gases present in the carbon dioxide rich flue gas may thus be removed in a vent gas.

There is further provided a boiler system comprising
a boiler being operative for combusting a fuel in the presence of a gas containing oxygen gas and generating a carbon dioxide rich flue gas, and
a flue gas treatment system as laid out above being operative for treating the carbon dioxide rich flue gas.

Thus, the boiler may be operative for combusting the fuel in accordance with the so called oxy-fuel process. In an oxy-fuel process a fuel, such as one of the fuels mentioned below, is combusted in the presence of a carbon dioxide rich gas as further exemplified above. Oxygen gas, which is provided by an oxygen source, is supplied to a boiler in which the oxygen gas oxidizes the fuel. Thus, the boiler system may be provided with an oxygen gas inlet being operative for providing oxygen gas from an oxygen source to the boiler.

The boiler system may further comprise
a return line being operative for returning to the boiler a portion of the flue gas treated by the gas cleaning system.

The boiler system may further comprise a heat exchanger operative for transferring heat from the flue gas treated to a working fluid of a water-steam cycle of the boiler. The heat may be transferred in order to generate steam or to preheat a condensate or boiler feed water.

Further objects and features will be apparent from and exemplified by the following FIGURES and detailed description.

BRIEF DESCRIPTION OF THE DRAWINGS

It is now referred to the appended drawings, which are exemplary embodiments, and wherein the like elements are numbered alike.

FIG. 1 is a schematic view of a boiler system in accordance with the present invention.

DETAILED DESCRIPTION

FIG. 1 is a schematic representation of a boiler system 1. The boiler system 1 comprises, as main components, a boiler 2, being in this embodiment an oxy-fuel boiler, a gas cleaning system 4, a nitrogen oxides reduction unit 8, and a gas processing unit 10. The gas cleaning system 4 comprises a dust removal device 12, which may be a fabric filter, and a sulphur removal system 14, which may be a wet scrubber. The gas processing unit 10 comprises a first compression and cooling device 16, a dehydration unit 18, and a second compression device 20.

A fuel, such as coal, oil, or peat, is contained in a fuel storage 22, and can be supplied to the boiler 2 via a supply pipe 24. An oxygen gas source 26 is operative for providing oxygen gas in a manner which is known per se. The oxygen gas source 26 may be an air separation plant operative for separating oxygen gas from air, an oxygen separating membrane, a storage tank, or any other source for providing oxygen gas to the boiler system 1. A supply duct 28 is operative for forwarding the produced oxygen gas, comprising typically 90-99.9 vol % oxygen, $O_2$, to the boiler 2. A duct 30 is operative for forwarding recirculated flue gas, which contains carbon dioxide, to the boiler 2. As indicated in FIG. 1, the supply duct 28 joins the duct 30 upstream of the boiler 2, such that oxygen gas and recirculated flue gas, which contains carbon dioxide, may become mixed with each other to form a gas mixture containing typically about 20-50% by volume of oxygen gas, the balance being mainly carbon dioxide and water vapour, upstream of the boiler 2. Since almost no air enters the boiler 2 there is almost no nitrogen gas supplied to the boiler 2. In practical operation, less than 3% by volume of the gas volume supplied to the boiler 2 is air, which mainly enters the boiler system 1 as a leakage of air via, for example, the boiler 2 and the gas cleaning system 4. The boiler 2 is operative for combusting the fuel that is to be supplied via the supply pipe 24, in the presence of the oxygen gas, mixed with the recirculated flue gas, which contains carbon dioxide that is to be supplied via the duct 30. Steam, that will be produced in the boiler 2 as a result of the combustion is forwarded to a steam turbine electric power generation system (not shown), which is operative for generating power in the form of electric power.

A duct 32 is operative for forwarding carbon dioxide rich flue gas generated in the boiler 2 to the dust removal device 12. By "carbon dioxide rich flue gas" is meant that the flue gas leaving the boiler 2 via the duct 32 will contain at least 40% by volume of carbon dioxide, $CO_2$. Often more than 50% by volume of the flue gas leaving the boiler 2 will be carbon dioxide. Typically, the flue gas leaving boiler 2 will contain 50-80% by volume of carbon dioxide. The balance of the "carbon dioxide rich flue gas" will be about 15-40% by volume of water vapour ($H_2O$), 2-7% by volume of oxygen ($O_2$), since a slight oxygen excess is often preferred in the boiler 2, and totally about 0-10% by volume of other gases, including mainly nitrogen ($N_2$) and argon (Ar), since some leakage of air can seldom be completely avoided.

The carbon dioxide rich flue gas generated in the boiler 2 may typically comprise contaminants in the form of, for example, dust particles, hydrochloric acid, HCl, sulphur oxides, $SO_X$, and sometimes heavy metals, such as mercury, Hg, that should be removed, at least partly, from the carbon dioxide rich flue gas prior to disposing of the carbon dioxide.

The dust removal device 12, which may be a fabric filter of a type which is per se known from, for example, U.S. Pat. No. 4,336,035 removes most of the dust particles from the carbon dioxide rich flue gas. A duct 34 is operative for forwarding the carbon dioxide rich flue gas from the dust removal device 12 to the sulphur removal system 14 of the gas cleaning system 4.

The sulphur removal system 14 may be a wet scrubber of the tower scrubber type, a scrubber type which is per se known from, for example, EP 0 162 536. The sulphur removal system 14 is operative for removing at least a portion, and preferably at least 80%, of the sulphur dioxide content of the carbon dioxide rich flue gas coming from the boiler 2 via the dust removal device 12. As alternative to the wet scrubber, other devices may be utilized for removing sulphur dioxide from the carbon dioxide rich flue gas. One such alternative device is a bubbling bed scrubber, an example of which is disclosed in WO 2005/007274.

An at least partly cleaned carbon dioxide rich flue gas leaves the sulphur removal system 14 via a duct 36 which forwards the flue gas to a first gas splitting point 38, where the at least partly cleaned carbon dioxide rich flue gas is divided into at least two flows, namely a first flow, which via the duct 30 is recirculated back to the boiler 2, and a second flow, which via a duct 40 is forwarded to a second gas splitting point 42. The first flow, which is recirculated back to the boiler 2 via the duct 30, typically comprises 50-75% by volume of the total flow of the partly cleaned carbon dioxide rich flue gas leaving the gas cleaning system 4. The second flow, typically comprising 25-50% by volume of the total flow of the partly cleaned carbon dioxide rich flue gas leaving the gas cleaning system 4, is, hence, forwarded, via the duct 40, to the second gas splitting point 42. Optionally, the at least partly cleaned carbon dioxide rich flue gas may be divided into a third flow which provides the flue gas to a stack 45 via duct 43.

At the gas splitting point 42, the carbon dioxide rich flue gas is again divided into two flows, namely a fourth flow, which via a duct 44 is used mainly as transport and sealing gas and as such recirculated back to the boiler 2, and a fifth flow which via a duct 46 is forwarded to the catalytic oxidation unit 6.

As mentioned, the carbon dioxide rich flue gas is forwarded, via the duct 46, to the nitrogen oxides reduction unit 8. At least a portion of the nitrogen oxide(s) present in the carbon dioxide rich flue gas is reduced in the nitric oxides reduction unit 8. Reduction of nitrogen oxide(s) is performed by selective catalytic reduction, SCR. The nitrogen oxide(s) react, in the nitrogen oxides reduction unit 8, with the aid of a catalyst with a gaseous reductant to form nitrogen, $N_2$, and water. The SCR typically occurs at a temperature of about 180-350° C. The gaseous reductant, which may be ammonia or urea, is supplied from a reductant storage 54 to the nitrogen oxides reduction unit 8 via a pipe 56 to be mixed with the carbon dioxide rich flue gas and to react with the nitrogen oxide(s) in the nitrogen oxides reduction unit 8 to reduce at least a portion of the nitrogen oxide(s).

The carbon dioxide rich flue gas resulting from the nitrogen oxides reduction unit 8 is forwarded, via a duct 58, to a condenser 60 before entering the gas processing unit, GPU, 10. In the condenser 60, contact between a circulating cooling liquid and the carbon dioxide rich flue gas causes a condensation of at least a portion of the water vapour content of the carbon dioxide rich flue gas. Hence, the water vapour content of the at least partly cleaned carbon dioxide rich flue gas entering the GPU 10 will be reduced. Typically, the condenser 60 would cause a reduction of the water vapour content of the at least partly cleaned carbon dioxide rich flue gas from typically about 15-40% by volume, to typically about 0.5-10% by volume. The flue gas exiting the condenser 60 is less than approximately 30 degrees Celsius. Hence, the amount of water vapour that would need to be removed from the carbon dioxide in the GPU 10 is substantially reduced by means of the condenser 60.

A carbon dioxide rich flue gas is forwarded from the condenser 60, via a duct 62, to the first compression and cooling device 16 of the GPU 10. The GPU 10 may comprise a number of per se known parts that are integrated to a GPU 10 which provides for a final polishing of the carbon dioxide rich flue gas and compresses the carbon dioxide rich flue gas to a suitable pressure for disposal. The first compression and cooling device 16 comprises typically two to six low pressure compression arrangements arranged in series, each such arrangement comprising a compression device in the form of at least one compressor, a cooler, and a gas-liquid separator. The respective compressor compresses the gas which is then forwarded to the respective cooler. The respective cooler is supplied with a cooling media circulated in the coolers, for cooling the compressed gas. As an effect of such cooling, water vapour condenses. Such condensed water vapour is separated from the remaining carbon dioxide rich flue gas in the respective gas-liquid separator. The water is removed via a pipe system. The gas is then forwarded to the subsequent compression arrangement. Typically each low pressure compression arrangement has a compression ratio of 1.5 to 2.5. Hence, the carbon dioxide rich flue gas entering the first compression and cooling device 16 may have a pressure which is close to atmospheric pressure, i.e. around 1 bar (a), and the carbon dioxide rich flue gas leaving the first compression and cooling device 16, after being treated in, for example, four consecutive low pressure compression arrangements, may have a pressure of typically 20-50 bar(a), more typically 20-40 bar (a), and most typically 30-40 bar (a). Simultaneously with the pressure being increased with each compression arrangement, the water content of the gas is reduced, since condensed water vapour is removed from each gas-liquid separator. Typically, the gas entering the first compression and cooling device 16 via the duct 62 may have a water content 0.5-10% by volume. The gas leaving the first compression and cooling device 16 may typically have a water vapour content of 400-1500 parts per million (ppm).

The carbon dioxide rich flue gas, having a pressure of 30-40 bar (a), a water vapour content of 400-1500 ppm and a temperature of typically 6-40° C. leaves the first compression and cooling device 16 and is forwarded, via a duct 64, to the dehydration unit 18, which comprises one dryer bed in operation and one dryer bed in stand-by. The dryer beds comprise a drying agent, such as a molecular sieve or a zeolite, to which water vapour present in the carbon dioxide rich flue gas is adsorbed and/or absorbed. The resulting water dew point is typically less than −40° C. The direction of flow of the carbon dioxide rich flue gas through the dryer bed in operation is from top down, while the direction of flow of regeneration gas during regeneration is from bottom upwards. Typically, the carbon dioxide rich flue gas leaving the dehydration unit 18 via a duct 66 has a water vapour content of below 10 to 100 ppm, typically well below 20 ppm. It will be appreciated that other devices could be used as a dehydration unit, such as a molecular sieve unit or a glycol scrubber in which glycol is circulated for capturing water vapour. $NO_x$ from the carbon dioxide rich flue gas may accumulate in the dryer bed due to, e.g., co-adsorption. When the dryer bed is regenerated, such accumulated $NO_x$ may be released into the regeneration gas. Regeneration gas containing NOx may be recirculated from the dehydration unit 18 to the boiler 2 via a duct 67.

It is common in prior art gas processing units to pass the carbon dioxide rich flue gas leaving the dehydration unit 18 via a $CO_2$ separation unit in the duct 66. Such a $CO_2$ separation unit is optional in the boiler system 1. The carbon dioxide rich flue gas leaving the dehydration unit 18 may thus typically have a carbon dioxide concentration of as much as 90-97% by volume. For this reason, no $CO_2$ separation unit is shown in FIG. 1.

Carbon dioxide rich flue gas transported in the duct 66 enters the second compression device 20. The second compression device 20 comprises typically one to three high pressure compression arrangements arranged in series, each such arrangement comprising a compression device in the form of at least one compressor, and a cooler. The respective compressor compresses the gas which is then forwarded to the respective cooler. The respective cooler is supplied with a cooling media circulated in the coolers, for cooling the compressed gas. Each compressor has a compression ratio of 1.5 to 2.5, meaning that the carbon dioxide gas leaving second compression device 20 via a duct 68 has a pressure of, typically, 100-200 bar(a), more often 110-140 bar(a) and a temperature of typically 20-60° C. The carbon dioxide in the duct 68 leaves the GPU 10 for final disposal, which is sometimes referred to as $CO_2$ sequestration. In case a CO2 separation process has to be applied the residual vent gas may be provided to the stack 45 by duct 69.

As regards the energy economy of boiler system 1, it will now be referred to some exemplary heat exchangers present in boiler system 1.

Carbon dioxide rich flue gas recirculated to the boiler 2 via the duct 30 and via the ducts 40, 44 as well as carbon dioxide rich flue gas forwarded to the catalytic oxidation unit 6 via the ducts 40, 46 is heated in a gas-gas heater 70 by flue gas leaving the boiler via the duct 32. As compared to a conventional system, wherein merely carbon dioxide rich flue gas recirculated to the boiler 2 via the duct 30 is heated in a gas-gas heater by flue gas leaving the boiler, the present system provides for a better use of the heat in the flue gas leaving the boiler since the total gas flow rate on the hot and cold sides, respectively, of the gas-gas heater 70 are more equal.

The gas splitting point 42 is located such that any auxiliary preheating of the carbon dioxide rich flue gas 46 is minimized, i.e. typically downstream of the gas-gas heater 70.

Carbon dioxide rich flue gas leaving the nitric oxides reduction unit 8 via the duct 58 has a temperature of more than about 250° C. and is passed through a heat exchanger 74, in the duct 58, where it may contribute to preheating of condensate for the water-steam cycle of the boiler 2. Since the acid dew point of the flue gas stream is lowered in the preceding sulphur removal system 14 and nitrogen oxides reduction unit 8, heat integration via the heat exchanger 74 is facilitated. The dust removal system is operated at temperatures above the acid dew point. Modern power plant systems foresee the recovery of heat, that otherwise would be dissipated in the sulphur removal system (WFGD or the like), in a heat exchanger often referred to as Flue Gas Heat Recovery System. In this exchanger the sensible heat is transferred into the water of the water steam cycle either directly or indirectly using sort of a heat transfer fluid.

In FIG. 1 are also illustrated optional adaptations of the boiler system for oil firing in the boiler 2. In case of oil firing, the dispersion of the oil at the burner tip is usually accomplished by means of steam injection. Accordingly, steam may be supplied to the burners of the boiler 2 via a duct 106. Alternatively, or additionally, dispersion of the oil at the burner tip may be accomplished by means of carbon dioxide injection. Accordingly, carbon dioxide rich gas leaving the gas processing unit 10 via the duct 68 may be supplied to the burners of the boiler 2 via a duct 107.

As mentioned above, the fourth flow of carbon dioxide rich flue gas is used mainly as a transport and sealing gas and as such recirculated via the duct 44 to the boiler 2. Operation of transport and sealing gas systems (not shown) may require removal of water vapour from the carbon dioxide rich flue gas before heating of said gas in the gas-gas heater 70, to avoid agglomeration of the fuel. For this reason, the boiler system 1 comprises an optional condenser 108 in the duct 40 upstream, in the direction of flow of the carbon dioxide rich flue gas, of the gas-gas heater 70. Such an optional condenser may, however, also be present in the boiler system 1 of FIG. 1. The optional condenser 108 is of the same kind as the condenser 60 in the boiler system 1 of FIG. 1 and provides, in addition to its function for the transport and sealing gas systems, an initial polishing of the carbon dioxide rich flue gas before said flue gas enters the nitrogen oxides reduction unit 8.

As mentioned above, the carbon dioxide rich flue gas leaving the dehydration unit 18, and having previously been treated in the catalytic oxidation unit 6, may typically have a carbon dioxide concentration of as much as 90-97% by volume. In case the carbon dioxide quality of the carbon dioxide rich flue gas leaving the dehydration unit 18 does not meet the required product specification, the boiler system includes an optional $CO_2$ separation unit (not shown) in the duct 66.

The optional $CO_2$ separation unit comprises a heat exchanger, a flash vessel and flash valves. The carbon dioxide rich flue gas entering the $CO_2$ separation unit is first cooled in the heat exchanger by non-condensable gases and liquefied $CO_2$ leaving the flash vessel and acting as cooling media. The cooled carbon dioxide rich flue gas then enters the flash vessel. In the flash vessel, the gas and formed liquid is separated. The liquid is flashed to a lower pressure, typically a pressure which is 5-15 bar lower than that pressure at which the carbon dioxide rich flue gas enters $CO_2$ separation unit. The main parameter for the flashing of the liquid is the adiabatic expansion temperature of the $CO_2$ liquid stream that will set the required pressure reduction, as this is providing the required driving force in the flue gas cooling process. The pressure and temperature pair during flue gas condensation is selected such that mainly carbon dioxide is liquefied, leaving other gases, including, for example, nitrogen, $N_2$, oxygen, $O_2$, and argon, Ar, in a gaseous state. Such other gases, which may be referred to as non-condensable gases, leave the flash vessel at its top. The pressure reduced liquefied carbon dioxide is used, as mentioned above, as cooling medium in the heat exchanger. In the heat exchanger the liquefied carbon dioxide is reheated to form again a carbon dioxide gas, such gas leaving the $CO_2$ separation unit 110 for further treatment in the GPU 10. The carbon dioxide gas leaving the $CO_2$ separation unit 110 typically has a pressure of 5-30 bar (a) and a temperature of −20 to 60° C. The non-condensable gases leave the $CO_2$ separation unit and may be disposed of.

In case the residual $NO_x$ content of the carbon dioxide rich flue gas does not meet the required product specification, such as if the reduction of nitrogen oxide(s) in the nitrogen oxides reduction unit 8 is not sufficient, the $CO_2$ separation unit includes an optional recirculation duct. A first fraction of condensed carbon dioxide, comprising also condensed nitrogen oxide(s), from the $CO_2$ separation unit 110 may, after evaporation of the condensates, be recirculated via the recirculation duct 112 to the boiler 2. The heat input in the boiler 2 will lead to partial decomposition of the recirculated nitrogen oxide(s).

To summarize, the catalytic oxidation unit 6 and the nitrogen oxides reduction unit 8 limits the formation in the GPU 10, particularly in the first compression and cooling device 16, of nitric and nitrous acids. A limited formation of acids contributes to more efficient operation of the dehydration unit 18. Utilization of the heat of the flue gas after the nitrogen oxides reduction unite 8 by heating, in heat exchanger 74, a working fluid of the water-steam cycle of the boiler 2, lowers the total energy demand of the boiler system 1.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of treating a carbon dioxide rich flue gas, the carbon dioxide rich flue gas further comprising contaminants, oxygen gas, water vapour, one or more nitrogen oxide(s), and, optionally, combustibles, wherein the method comprises:
    at least a portion of the contaminants comprised in the carbon dioxide rich flue gas is removed in a gas cleaning system to obtain a cleaned carbon dioxide rich flue gas;
    at least a portion of the cleaned carbon dioxide rich flue gas is heated in a gas-gas heater;
   at least a portion of the one or more nitrogen oxide(s) comprised in the heated and cleaned carbon dioxide rich flue gas is reduced in a nitrogen gas reduction unit to obtain a cleaned and nitrogen oxide(s) depleted carbon dioxide rich flue gas;
        at least a portion of the cleaned and nitrogen oxide(s) depleted carbon dioxide rich flue gas is sent to a gas processing unit, wherein the gas processing unit comprises a first pressurization stage, where the cleaned and nitrogen oxide(s) depleted carbon dioxide rich flue gas is pressurized and cooled so that at least a portion of the water vapour comprised in the cleaned and nitrogen oxide(s) depleted carbon dioxide rich flue gas is condensed;
    at least a portion of the cleaned and nitrogen oxide(s) depleted carbon dioxide rich flue gas, after passing through the first pressurization stage, the pressurized, cleaned and nitrogen oxide(s) depleted carbon dioxide rich flue gas is forwarded to a dehydration unit so that at least a portion of the water vapour present is adsorbed to, or absorbed by, a drying agent; and
    at least a portion of the cleaned and nitrogen oxide(s) depleted carbon dioxide rich flue gas, after passing through the dehydration unit, is further pressurized and cooled in a second pressurization stage of the gas processing unit;
    wherein the method is devoid of condensation of carbon dioxide present in the carbon dioxide rich flue gas before the cleaned and nitrogen oxide(s) depleted carbon dioxide rich flue gas is pressurized in the second pressurization stage.

2. The method according to claim 1, wherein the carbon dioxide rich flue gas is generated in a boiler combusting a fuel in the presence of a gas comprising oxygen gas.

3. The method according to claim 2, wherein the fuel is combusted in the presence of a gas comprising more than about 30% by volume of carbon dioxide and comprising about 10 to 50% by volume of oxygen gas.

4. The method according to claim 1, wherein after removal of the contaminants comprised in the carbon dioxide rich flue gas, a portion of the cleaned carbon dioxide rich flue gas is returned to a boiler to be present during combustion of a fuel, and at least a portion of the one or more nitrogen oxide(s) comprised in the remaining portion of the cleaned carbon dioxide rich flue gas is reduced before the cleaned and nitrogen oxide(s) depleted carbon dioxide rich flue gas is pressurized and cooled in the first pressurization stage.

5. The method according to claim 1, wherein heat is transferred from the cleaned and nitrogen oxide(s) depleted carbon dioxide rich flue gas to a working fluid of a water steam cycle of a boiler.

6. The method according to claim 2, wherein heat is transferred from the cleaned and nitrogen oxide(s) depleted carbon dioxide rich flue gas to the gas comprising oxygen gas.

7. A flue gas treatment system for treatment of a carbon dioxide rich flue gas, the flue gas treatment system comprising:
    a gas cleaning system being operative for removing at least a portion of a contaminant content of the carbon dioxide rich flue gas;
    a gas-gas heater, being operative for heating at least a portion of the cleaned carbon dioxide rich flue gas;
    a nitrogen oxides reduction unit, being operative for reducing at least a portion of a nitrogen oxide(s) content of the carbon dioxide rich flue gas;
    a gas processing unit comprising a first compression and cooling device and a second compression and cooling device, the first compression and cooling device being operative for pressurizing and cooling at least a portion of the cleaned and nitrogen oxide(s) depleted carbon dioxide rich flue gas treated by the gas cleaning system and the nitrogen oxides reduction unit, so that at least a portion of a water vapour content comprised in the cleaned and nitrogen oxide(s) depleted carbon dioxide rich flue gas is condensed;

wherein:

the first compression and cooling device comprises a dehydration unit being operative for adsorbing to, or absorbing by, a drying agent, at least a portion of the water vapour content present in the flue gas treated by the first compression and cooling device;

the second compression and cooling device is operative for further pressurizing and cooling at least a portion of the flue gas treated by the dehydration unit; and the flue gas treatment system is devoid of a carbon dioxide condensation unit upstream, in the direction of flow of the carbon dioxide rich flue gas, of the second compression and cooling device.

8. The flue gas treatment system according to claim 7, further comprising, upstream, in the direction of flow of the carbon dioxide rich flue gas, of the nitrogen oxides reduction unit, a heat exchanger operative for transferring heat from the carbon dioxide rich flue gas upstream of the gas cleaning system to the carbon dioxide rich flue gas downstream of the gas cleaning system.

9. The flue gas treatment system according to claim 7, wherein the nitrogen oxides reduction unit is upstream, in the direction of flow of the carbon dioxide rich flue gas, of the first compression and cooling device.

10. A boiler system comprising:

a boiler being operative for combusting a fuel in the presence of a gas containing oxygen gas and generating a carbon dioxide rich flue gas, and a flue gas treatment system according to claim 9 being operative for treating the carbon dioxide rich flue gas.

11. The boiler system according to claim 10, further comprising a return line being operative for returning to the boiler a portion of the cleaned carbon dioxide rich flue gas treated by the gas cleaning system.

12. The boiler system according to claim 10, further comprising a heat exchanger operative for transferring heat from the cleaned and nitrogen oxide(s) depleted carbon dioxide rich flue gas treated by the nitrogen oxides reduction unit to a working fluid of a water-steam cycle of the boiler.

13. The boiler system according to claim 10, further comprising a heat exchanger operative for transferring heat from the cleaned and nitrogen oxide(s) depleted carbon dioxide rich flue gas treated by the nitrogen oxides reduction unit to an oxygen rich stream.

14. The method according to claim 2, wherein the fuel is combusted in the presence of a gas comprising more than about 35% by volume of carbon dioxide and about 21 to 32% by volume of oxygen gas.

15. A method of treating a carbon dioxide rich flue gas, the method comprising:

forwarding the carbon dioxide rich flue gas to a gas cleaning system to remove contaminants from the carbon dioxide rich flue gas and produce a cleaned carbon dioxide rich flue gas;

forwarding at least a first portion of the cleaned carbon dioxide rich flue gas to a boiler used to produce the carbon dioxide rich flue gas;

forwarding at least a second portion of the cleaned carbon dioxide rich flue gas to a gas-gas heater and then forwarding the heated and cleaned carbon dioxide rich flue gas to a nitrogen oxides reduction unit to reduce nitrogen oxides present in the heated and cleaned carbon dioxide rich flue gas to nitrogen and water and produce a cleaned and nitrogen oxide(s) depleted carbon dioxide rich flue gas stream; and providing the cleaned and nitrogen oxide(s) depleted carbon dioxide rich flue gas stream to a condenser having a first stage and a second stage, the first stage operative to condense at least a portion of water vapour present in the cleaned and nitrogen oxide(s) depleted carbon dioxide rich flue gas stream to produce a cleaned, nitrogen oxide(s), and water vapour depleted carbon dioxide rich flue gas stream, and the second stage operative to further pressurize and cool at least a portion of the cleaned nitrogen oxide(s) depleted carbon dioxide rich flue gas.

* * * * *